United States Patent
Kim et al.

(10) Patent No.: US 9,598,570 B2
(45) Date of Patent: Mar. 21, 2017

(54) COMPOSITION FOR OPTICAL FILM AND OPTICAL FILM PREPARED BY USING THE SAME

(71) Applicant: LG Chem, Ltd., Seoul (KR)

(72) Inventors: Jung Hyun Kim, Daejeon (KR); Dai Seung Choi, Daejeon (KR); Ji Young Choi, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/960,990

(22) Filed: Dec. 7, 2015

(65) Prior Publication Data

US 2016/0160036 A1    Jun. 9, 2016

(30) Foreign Application Priority Data

Dec. 8, 2014 (KR) .................. 10-2014-0174983
Nov. 18, 2015 (KR) .................. 10-2015-0161987

(51) Int. Cl.
| | | |
|---|---|---|
| *G02B 1/04* | (2006.01) | |
| *C08L 45/00* | (2006.01) | |
| *C08L 83/04* | (2006.01) | |
| *G02B 5/30* | (2006.01) | |
| *G02B 1/08* | (2006.01) | |

(52) U.S. Cl.
CPC .............. *C08L 45/00* (2013.01); *G02B 1/04* (2013.01); *G02B 1/08* (2013.01); *G02B 5/3083* (2013.01); *C08L 2203/16* (2013.01)

(58) Field of Classification Search
CPC .............................. G02B 1/04; G02B 3/3083
USPC .......... 428/1.1, 1.2, 1.23, 1.3, 1.32, 1.4, 1.5, 428/1.52, 1.55, 1.6
See application file for complete search history.

(56) References Cited

U.S. PATENT DOCUMENTS

| | | | | |
|---|---|---|---|---|
| 5,334,424 A | * | 8/1994 | Hani ................ | G02F 1/133305 428/1.6 |
| 6,114,449 A | | 9/2000 | Tojo et al. | |
| 6,730,736 B1 | * | 5/2004 | Kaita ..................... | C08F 8/00 525/210 |
| 7,148,302 B2 | | 12/2006 | Lipian | |
| 8,207,279 B2 | | 6/2012 | Choi et al. | |
| 2004/0044127 A1 | | 3/2004 | Okubo et al. | |
| 2005/0010006 A1 | | 1/2005 | Chun et al. | |
| 2005/0171258 A1 | | 8/2005 | Choi et al. | |
| 2007/0255027 A1 | | 11/2007 | Jung et al. | |
| 2008/0113116 A1 | * | 5/2008 | Hiraike ................. | C08F 210/02 428/1.3 |
| 2009/0009866 A1 | * | 1/2009 | Hisakado ............. | G02B 5/3083 359/489.2 |
| 2009/0040451 A1 | * | 2/2009 | Suzuki ....................... | C08J 5/18 349/183 |
| 2010/0010177 A1 | | 1/2010 | Choi et al. | |
| 2011/0003092 A1 | | 1/2011 | Lovgren et al. | |
| 2015/0015949 A1 | * | 1/2015 | Ueki ..................... | G02B 5/3033 359/489.07 |

FOREIGN PATENT DOCUMENTS

| | | |
|---|---|---|
| JP | H10138382 A | 5/1998 |
| JP | 2005213365 A | 8/2005 |
| JP | 2012532036 A | 12/2012 |
| JP | 2013205468 A | 10/2013 |
| JP | 2014126817 A | 7/2014 |
| KP | 20070104959 | 10/2007 |
| KR | 10-0561068 B1 | 3/2006 |
| KR | 100590474 B1 | 6/2006 |
| KR | 20070100661 A | 10/2007 |
| KR | 20070106223 | 11/2007 |
| KR | 20080036958 A | 4/2008 |
| KR | 10-0873779 B1 | 12/2008 |
| KR | 10-0960442 B1 | 5/2010 |
| WO | 2013189027 A1 | 12/2013 |

OTHER PUBLICATIONS

Il Gu Jung, et al., "Polymerization of Carboxylic Ester Functionalized Norbornenes Catalyzed by (n3-Allyl)palladium Complexes Bearing N-Heterocyclic Carbene Ligands." Journal of Polymer Science: Part A: Polymer Chemistry, vol. 45, 3042-3052 (2007).

* cited by examiner

*Primary Examiner* — Marc Zimmer
(74) *Attorney, Agent, or Firm* — Lerner, David, Littenberg, Krumholz & Mentlik, LLP

(57) ABSTRACT

The present invention relates to a composition for an optical film comprising a homopolymer or a copolymer of norbonene-based monomers and a silicone resin, and to an optical film made of the same. The optical film produced by using the composition for an optical film according to the present invention can control the retardation value in the thickness direction and thus it can be useful as an optical film in variety of products.

10 Claims, No Drawings

COMPOSITION FOR OPTICAL FILM AND OPTICAL FILM PREPARED BY USING THE SAME

CROSS-REFERENCE TO RELATED APPLICATION(S)

This application claims the benefit of Korean Patent Application No. 10-2014-0174983 on Dec. 8, 2014, and Korean Patent Application No. 10-2015-0161987 on Nov. 18, 2015 with the Korean Intellectual Property Office, the disclosures of which are herein incorporated by reference in its entirety.

TECHNICAL FIELD

The present invention relates to a composition for an optical film comprising silicon resins together with homopolymers or copolymers of norbornene-based monomers and to an optical film prepared by using the same.

BACKGROUND OF ART

Liquid crystal display devices can be driven with a battery for several hours due to their low power consumption. The occupied space is narrow due to a small volume, and it is portable due to a light weight. For these reasons, the liquid crystal display devices have been used in various applications. In addition, the sizes of a product may vary from small-sized to large-sized. The display devices trend to use a mobile phone as the small-sized and a large TV as the large-sized. In particular, in the case of the medium and large-sized liquid crystal display devices, having clear image quality at a light viewing angle of the wide angle and enhancing the brightness contrast at ON/OFF of the drive cells are important to ensure the display quality.

The liquid crystal display devices have been used or developed as various liquid crystal modes such as dual domain TN, ASM (axially symmetric aligned microcell), VA (vertical alignment), SE (surrounding electrode), PVA (patterned VA) and IPS (in-plane switching) mode. Each of these modes has a unique liquid crystal alignment and a unique optical anisotropy. Therefore, due to the optical anisotropy of these liquid crystal modes, compensation films with various optical anisotropy are required to compensate changes in the optical axes of the linearly polarized light.

For the compensation films, it is important to have the optical anisotropy not only for the optical compensation due to the liquid crystal which is an optically anisotropic substance but also for the improvement of the light leakage occurring at a light viewing angle of around 45° from the optical axis of the orthogonal polarization elements.

Therefore, for the optical compensation of the liquid display of various modes, the development of the optical film capable of controlling the optical anisotropy precisely and effectively is as importance as anything else.

Further, in the case of the optical film which is used for display devices with more than 30 inch-large screen, it needs to be stretched to a high stretching ratio. The optical film is produced by stretching a polymer film under high-temperature and high-humidity, and it is highly likely that dimensional changes may occur in this process. If the dimension of the polymer film is changed, a stress is generated between the polarizing element and the resin film. When the screen displayed black, it is likely to cause a corner unevenness in which corner portion is missing in white color. Therefore, in order to produce an optical film which is suitable for a large screen, polymeric materials with small dimensional changes are required even in the case where it is stretched to a high stretching ratio.

Meanwhile, homopolymers or copolymers of cyclic olefins are well known through literatures or the like. The cyclic olefin-based polymers produced by addition polymerization using a homogeneous catalyst have a cyclic structure which is hard and sterically bulky to monomeric units of all the main chain. Thus, these polymers are amorphous polymers having very high glass transition temperature (Tg), and there is no light loss due to scattering as in crystalline polymers. Furthermore, there is no light absorption in the visible ray region due to the p-conjugation. In particular, the cyclic olefin-based polymers having a relatively large molecular weight which are produced by addition polymerization using an organic metal compound as a catalyst have a low dielectric constant and an electrically excellent isotropy.

Due to such physical properties such as a high permeability, a low double refractive index and a high glass transition temperature (Tg), the polymers polymerized using norbornene monomers can be used for optical application such as a light-guiding plate or an optical disc. They can also be used as an insulating material due to their low dielectric constant, excellent adhesion strength, electrical isotropy and high glass transition temperature (Tg).

However, since the optical films produced by polymers or copolymers of conventionally known cyclic olefins have a very high retardation value in the thickness direction, there is a need to develop a method capable of controlling this retardation value properly.

Given the above circumstances, the present inventors have conducted extensive studies to develop a composition for an optical film capable of having excellent optical properties as well as controlling the retardation value in the thickness direction of the optical film. As a result, the inventors found that the composition for an optical film comprising silicone resins as described below satisfies the above requirements, and completed the present invention.

DETAILED DESCRIPTION OF THE INVENTION

[Technical Problem]

It is an object of the present invention to provide a composition for an optical film capable of having excellent optical properties as well as controlling the retardation value in the thickness direction of the optical film.

It is another object of the present invention to provide an optical film produced by using the above-described composition for an optical film.

[Technical Solution]

In order to achieve these objects, the present invention provides a composition for an optical film comprising: (i) a polymer containing one or two kinds of repeating units represented by the following Chemical Formula 1 and having a weight average molecular weight of 100,000 to 1,000,000, and (ii) a silicone resin:

[Chemical Formula 1]

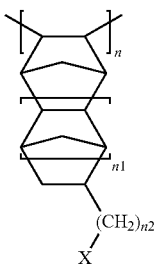

in the above Formula 1,
n1 is an integer of 0 to 4,
n2 is an integer of 0 to 4,
X is —COO—$R_1$, —OCO—$R_1$, —CO—$R_1$, —OCOO—$R_1$, —CO—O—CO—$R_1$, —CO—NH—CO—$R_1$, —O—$R_1$, —CS—$R_1$, —S—$R_1$, —SS—$R_1$, —SO—$R_1$, —$SO_2$—$R_1$, —$SO_3$—$R_1$, —$OSO_2$—$R_1$, —$OSO_3$—$R_1$, —NHCO—$R_1$, —NHCOO—$R_1$, —NNCS—$R_1$, —CONHCO—$R_1$, or —CONHCOO—$R_1$, and
$R_1$ is a $C_{1-10}$ alkyl unsubstituted, or substituted with a hydroxyl, or $C_{6-20}$ aryl.

The repeating units represented by the Chemical Formula 1 are norbonene-based repeating units of the polymer according to the present invention, and the above polymer is a homopolymer containing one kind of repeating unit or a copolymer containing two kinds of repeating units. In this case, containing two kinds of repeating units refers to containing two repeating units which are not identical with each other.

The optical films produced by using the above polymer have excellent optical properties, but they generally show a very high retardation value in the thickness direction. There is a need for a method capable of properly lowering the retardation value, depending on the products that the optical films are used. In this regard, the present invention has a characteristic in that the retardation value in the thickness direction can be reduced by using a silicone resin in addition to the above polymer.

The silicone resin is a polymer resin having —Si—O—Si—O— chain as a main chain, which is a substance widely used in overall industries. In addition to the above main chain, the silicone resin has a methyl or phenyl group as an organic group and a hydroxy or methoxy as a functional group. In the present invention, the silicone resin is used in the composition for an optical film along with the polymer containing norbonene-based repeating units, and it is also used to control the retardation value in the thickness direction during the film producing process.

Preferably, the silicon resin is represented by the following Chemical Formula 2:

[Chemical Formula 2]

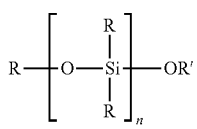

in the above Formula 2,
R is each independently $C_{1-10}$ alkyl, or $C_{6-10}$ aryl,
R' is hydrogen, or $C_{1-10}$ alkyl, and
n is an integer of 1 to 200,000.

Preferably, R is each independently methyl, or phenyl. Also, preferably, R all is methyl, or the ratio of phenyl and methyl (phenyl/methyl) in the whole R is 1:1 to 1:5. Also, preferably, n is an integer of 1 to 1,000.

In addition, examples of the silicone resin may include RSN-0233 available from Dow Corning Corporation, SILIKOPHEN P50/X available from TEGO Inc., RSN-0804 available from Dow Corning Corporation, US-CF-2403 available from Dow Corning Corporation.

Preferably, the weight ratio of the polymer and the silicone resin in the composition for an optical film is 51~99.9:0.1~49. When the content of the silicone resin in the composition for an optical film exceeds the above weight ratio, there is a problem that the retardation value in the thickness direction in the film producing process becomes too low. When the content of the silicone resin in the composition for an optical film is lower than the above weight ratio, it is difficult to control the retardation value in the thickness direction in the film producing process. Preferably, the weight ratio of the polymer and the silicone resin in the composition for an optical film is 80~99:1~20.

In the Chemical Formula 1, n1 and n2 are preferably 0. Also, preferably, X is —COO—$R_1$.

Furthermore, the above polymer may be a copolymer containing two kinds of repeating units represented by the Chemical Formula 1. In this case, preferably, $R_1$ of one repeating unit is a $C_{4-10}$ alkyl unsubstituted or substituted with a hydroxy or $C_{6-20}$ aryl, and $R_1$ of the other repeating unit is a $C_{1-3}$ alkyl unsubstituted or substituted with a hydroxy or $C_{6-20}$ aryl. Further, more preferably, the above polymer includes i) 60% to 99.9% by weight of repeating unit wherein $R_1$ is a $C_{4-10}$ alkyl unsubstituted or substituted with a hydroxy or $C_{6-20}$ aryl; and ii) 0.1% to 40% by weight of repeating unit wherein $R_1$ is a $C_{1-3}$ alkyl unsubstituted or substituted with a hydroxy or $C_{6-20}$ aryl. Further, preferably, $R_1$ of one repeating unit is butyl and $R_1$ of the other repeating unit is methyl.

Further, the weight average molecular weight of the polymer ranges preferably from 100,000 to 1,000,000. When the weight average molecular weight is less than 100,000, the film is fragile in the film producing process. Further, when the weight average molecular weight is greater than 1,000,000, there are problems in that the processability as a sheet decreases and, in the case of solution casting, it is difficult to dissolve it in an organic solvent and so the processability is lowered. Preferably, the weight average molecular weight ranges from 200,000 to 900,000, from 300,000 to 800,000 or from 400,000 to 700,000.

In the method for producing the polymer, the polymer can be polymerized using the monomers corresponding to the respective repeating units, and using the catalyst and solvent which are used in the vinyl-addition polymerization of conventional norbornene-based monomers. Examples of the catalyst may include Ti, Cr, Fe, Co, Ni, Pd and Cu, and examples of the cocatalyst may include methyl aluminoxane (MAO) or $B(C_6F_5)_3$ and the like.

The composition for an optical film according to the present invention is used to produce the optical film described later. In addition to the polymer and the silicone resin, a solvent and the like may be further included.

The above solvent is not particularly limited, for example, cyclic saturated hydrocarbons such as cyclohexane, cycloheptane or cyclooctane; aromatic hydrocarbons such as benzene, toluene, xylene, ethylbenzene, or cumene; halogenated alkanes or halogenated aryls such as chlorobutane, bromohexane, methylene chloride, dichloroethane, chlorobenzene, chloroform, or ethyl tetrachloride; saturated carboxylic acid esters such as ethyl acetate, n-butyl acetate, or methyl propionate; ethers such as dibutyl ether or tetrahydrofuran; and alcohols such as methanol or ethanol can be used, and these solvents can be used alone or in combination of two or more. In addition, alkanes such as pentane, hexane, octane, nonane, and decane be further used in combination of the above solvent.

Further, in order to improve the mechanical strength, heat resistance, light resistance and handling properties of the optical films to be produced, the composition for an optical film may further comprise additives such as plasticizers, antioxidants, UV stabilizers, and antistatic agents.

In addition, the present invention provides an optical film produced by using the composition for an optical film.

The base film may be produced by casting the composition for an optical film onto a substrate such as metal or glass polished to a mirror state using a knife coater or a bar coater and then drying the solvent. In this case, the drying temperature of the solvent can be selected according to the type of solvent used, and the surface temperature of the substrate such as metal or glass polished to a mirror state is preferably a room temperature or less.

The optical film has a characteristic that the retardation value in the thickness direction (Rth) of the below equation 1 is 120 to 150 nm:

$$Rth=[(Nx+Ny)/2-Nz]\times d \qquad [\text{Equation 1}]$$

in the above Equation 1,

Nx and Ny are a surface refractive index at 550 nm, Nz is a refractive index in the thickness direction of the optical film at 550 nm, and d is a thickness of the optical film.

According to one embodiment of the present invention, when using the silicone resin as in the present invention appears a lower retardation value in the thickness direction than when not using the silicone resin, and the retardation value can be controlled depending on the content of the silicone resin. Therefore, depending on the products that the optical film is used, it is possible to adjust the optical properties of the optical film by adjusting the content of the silicone resin in the composition for an optical film according to the present invention.

The optical film can have a thickness of 20 to 200 μm and preferably 20 to 60 μm.

The transparent metal oxide-based conductive film may be formed on an upper portion of the optical film. For example, ITO film, ATO film, IZO (Indium zinc oxide) film, indium film, tin oxide film, zinc oxide film, titanium oxide film or antimony oxide film and the like can be formed. The transparent metal oxide-based conductive film may be formed, for example, by a sputtering method at high temperature, however, the kind and the producing method are not limited thereto.

Further, the optical films can be further applied to methods such as uniaxial stretching or biaxial stretching. For example, they can be stretched in a tender which includes a pre-heating section, a stretching section and a heat treatment section.

The above-mentioned pre-heating refers to a process of pre-softening so as to be well stretched in the stretching step which is the next step. The optical film to be introduced into the preheater is stretched at a higher temperature than Tg of the optical film in subsequent stretching process or it may be subjected to cold-stretching step of stretching at a lower temperature than Tg of the optical film. Then, the stretched optical film is subjected to heat treatment for the purpose of fixing the orientation of the optical film at the heat treatment section. In this case, in accordance with the retardation value to be acquired, the stretching ratio can be adjusted in the stretching section.

Further, the present invention provides a display device comprising the optical film.

The configuration of the display device depends on the configuration of conventional display devices, except that the polymer according to the present invention is used, and thus more detailed description thereof will be omitted.

[Advantageous Effects]

The composition for an optical film according to the present invention can have excellent optical properties and also control the retardation value in the thickness direction of the optical film, thereby easily adjusting the optical properties required for various properties.

DETAILED DESCRIPTION OF THE EMBODIMENTS

Below, the present invention will be described in more detail with reference to the following examples. However, these examples are provided only for illustration of the present invention, and should not be construed as limiting the present invention by the examples.

Examples 1 to 12

(1) Production of the Cyclic Olefin-Based Polymers 749 g of 5-norbonene 2-carboxylic acid butyl ester wherein a proportion of exo was 71 mol %, and 251 g of 5-norbonene-2-carboxylic acid methyl ester wherein a proportion of exo was 71 mol % were introduced in the reactor at room temperature, to which 1500 g of xylene was added. The inside of the reactor was replaced with nitrogen, and the reactor was heated to 120° C.

Then, 0.116 g of palladium acetate trimer and 0.989 g of tricyclohexyl phosphonium tetrakis(pentafluorophenyl)borate as the catalysts were dissolved in dichloromethane, introduced in the reactor and then reacted with stirring for 18 hours. After the reaction, the reactants were precipitated using acetone and ethanol to obtain a white polymer precipitate. The precipitate was filtered by a filter and the resulting polymer was dried in a vacuum oven at 60° C. for 24 hours to obtain the cyclic olefin-based polymer (Mw=441K).

(2) Production of the Base Film

The polymer prepared in the above(1) and the silicone resin (RSN-0233 available from Dow Corning Corporation, SILIKOPHEN P50/X available from TEGO Inc., RSN-0804 available from Dow Corning Corporation, and US-CF-2403 available from Dow Corning Corporation) were dissolved in methylene chloride at the weight ratio shown in Table 1 below so that the solid content was set to 15 wt %. The above solution was filtered with a filter having a pore of 0.45 μm to produce a coating solution.

The above coating solution was casted on the glass substrate using a knife coater or a bar coater and then dried at room temperature for 1 hour, and again dried under nitrogen atmosphere at 100°C. for 1 hour. After drying, it was immersed for 30 seconds and then the film on the glass substrate was released to obtain a transparent film having a uniform thickness wherein the thickness deviation is less than 2%.

Comparative Example

The film was produced in the same manner as in the above Examples, except that the silicon resin was not used in the step (2) of the Examples.

Experimental Example

The retardation value (Ro, Rth) was measured using the polymer and film produced in the Examples and Comparative Example. In particular, Ro, Rth of each of the optical films was measured using Axo-scan apparatus. At this time, the thickness of each of the films was measured together. The results are shown in Table 1 below.

TABLE 1

| | Cyclic olefin-based polymer | | | Kinds of silicone resin | Silicone resin (wt %) | Ro (nm) | Rth (nm) | Rth/d (nm/μm) |
|---|---|---|---|---|---|---|---|---|
| | A(g)[1] | B(g)[2] | Content (wt %) | | | | | |
| Example 1 | 749 | 251 | 95 | RSN-0233 | 5 | 0 | 141.4 | 3.43 |
| Example 2 | 749 | 251 | 90 | RSN-0233 | 10 | 0 | 147.2 | 3.02 |
| Example 3 | 749 | 251 | 80 | RSN-0233 | 20 | 0 | 120.5 | 2.18 |
| Example 4 | 749 | 251 | 95 | SILIKOPHEN P50/X | 5 | 0 | 148.3 | 3.04 |
| Example 5 | 749 | 251 | 90 | SILIKOPHEN P50/X | 10 | 0 | 120.8 | 2.58 |
| Example 6 | 749 | 251 | 80 | SILIKOPHEN P50/X | 20 | 0 | 96.5 | 1.90 |
| Example 7 | 749 | 251 | 95 | RSN-0804 | 5 | 0 | 145.9 | 3.11 |
| Example 8 | 749 | 251 | 90 | RSN-0804 | 10 | 0 | 132.5 | 2.66 |
| Example 9 | 749 | 251 | 80 | RSN-0804 | 20 | 0 | 94.1 | 2.05 |
| Example 10 | 749 | 251 | 95 | US-CF-2403 | 5 | 0 | 141.2 | 3.15 |
| Example 11 | 749 | 251 | 90 | US-CF-2403 | 10 | 0 | 125.9 | 2.68 |
| Example 12 | 749 | 251 | 80 | US-CF-2403 | 20 | 0 | 87.4 | 2.10 |
| Comparative Example | 749 | 251 | 100 | | 0 | 0 | 171.9 | 3.79 |

[1]A: 5-norbonene-2-carboxylic acid methyl ester
[2]B: 5-norbonene-2-carboxylic acid buthyl ester As shown in Table 1 above, the Examples of the present invention containing the silicone resins showed that the retardation value in the thickness direction was lower than the Comparative Example and that in response to an increase in the content of the silicone resin, the retardation value in the thickness direction was more lowered.

It could be confirmed from the above results that by adjusting the content of the silicone resin in the composition for an optical film according to the present invention, an optical film having a desired retardation value in the thickness direction can be produced.

The invention claimed is:

1. A composition for an optical film comprising:
a polymer containing one or two kinds of repeating units represented by the following Chemical Formula 1 and having a weight average molecular weight of 100,000 to 1,000,000, and
and a silicone resin:

[Chemical Formula 1]

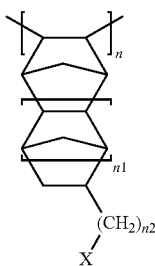

in the above Formula 1,
n1 is an integer of 0 to 4,
n2 is an integer of 0 to 4,
X is —COO—$R_1$, —OCO—$R_1$, —CO—$R_1$, —OCOO—$R_1$, —CO—O—CO—$R_1$, —CO—NH—CO—$R_1$, —O—$R_1$, —CS—$R_1$, —S—$R_1$, —SS—$R_1$, —SO—$R_1$, —$SO_2$—$R_1$, —$SO_3$—$R_1$, —$OSO_2$—$R_1$, —$OSO_3$—$R_1$, —NHCO—$R_1$, —NHCOO—$R_1$, —NNCS—$R_1$, —CONHCO—$R_1$, or —CONHCOO—$R_1$, and $R_1$ is a $C_{1-10}$ alkyl unsubstituted or substituted with a hydroxy or $C_{6-20}$ aryl,
wherein the polymer comprises two different kinds of the repeating units represented by the Chemical Formula 1, and
$R_1$ of one repeating unit is a $C_{4-10}$ alkyl unsubstituted or substituted with a hydroxy or $C_{6-20}$ aryl, and $R_1$ of the other repeating unit is a $C_{1-3}$ alkyl unsubstituted or substituted with a hydroxy or $C_{6-20}$ aryl.

2. The composition for an optical film according to claim 1,
wherein the weight ratio of the polymer and the silicone resin is 51~99.9:0.1~49.

3. The composition for an optical film according to claim 1,
wherein the weight ratio of the polymer and the silicone resin is 80~99:1~20.

4. The composition for an optical film according to claim 1,
wherein n1 and n2 are 0.

5. The composition for an optical film according to claim 1,
wherein X is —COO—$R_1$.

6. The composition for an optical film according to claim 1,
wherein the polymer comprises i) 60% to 99.9% by weight of repeating unit wherein $R_1$ is a $C_{4-10}$ alkyl unsubstituted or substituted with a hydroxy or $C_{6-20}$ aryl; and ii) 0.1% to 40% by weight of repeating unit wherein $R_1$ is a $C_{1-3}$ alkyl unsubstituted or substituted with a hydroxy or $C_{6-20}$ aryl.

7. The composition for an optical film according to claim 1,
wherein $R_1$ of one repeating unit is butyl, and $R_1$ of the other repeating unit is methyl.

8. The composition for an optical film according to claim 1,
wherein the silicon resin is represented by the following Chemical Formula 2:

[Chemical Formula 2]

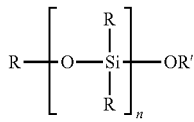

in the above Formula 2,
R is each independently $C_{1-10}$ alkyl, or $C_{6-10}$ aryl,
R' is hydrogen, or $C_{1-10}$ alkyl, and
n is an integer of 1 to 200,000.

9. An optical film produced by the composition for an optical film according to claim 1.

10. The optical film according to claim 9,
wherein the thickness-directional phase difference value (Rth) of the below equation 1 is 120 to 150 nm:

$$Rth = [(Nx+Ny)/2 - Nz] \times d \qquad \text{[Equation 1]}$$

in the above Equation 1,
Nx and Ny is a surface refractive index at 550 nm, Nz is a refractive index in the thickness direction of the optical film at 550 nm, and d is a thickness of the optical film.

\* \* \* \* \*